(12) United States Patent
Perrone

(10) Patent No.: US 8,845,333 B2
(45) Date of Patent: *Sep. 30, 2014

(54) FORCIBLE ENTRY TRAINING DOOR SYSTEM

(71) Applicant: Michael Perrone, Seaford, NY (US)

(72) Inventor: Michael Perrone, Seaford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,086

(22) Filed: Mar. 29, 2013

(65) Prior Publication Data

US 2013/0224701 A1 Aug. 29, 2013

Related U.S. Application Data

(63) Continuation of application No. 13/267,822, filed on Oct. 6, 2011, now Pat. No. 8,419,435.

(51) Int. Cl.
| | |
|---|---|
| G09B 19/00 | (2006.01) |
| G06Q 40/00 | (2012.01) |
| G06Q 20/20 | (2012.01) |
| G06Q 40/02 | (2012.01) |
| G09B 25/00 | (2006.01) |

(52) U.S. Cl.
CPC .............. *G09B 25/00* (2013.01); *G06Q 40/123* (2013.01); *G06Q 20/207* (2013.01); *G06Q 40/02* (2013.01); *G06Q 40/12* (2013.01)
USPC ........................................................ 434/226

(58) Field of Classification Search
USPC ............ 434/219, 226, 247, 258; 49/381, 394, 49/504; 292/163, 219, 240, 261
See application file for complete search history.

(56) References Cited

U.S. PATENT DOCUMENTS

| | | | | |
|---|---|---|---|---|
| 4,015,382 | A  * | 4/1977 | Noyes .............................. | 52/211 |
| 7,611,356 | B1 * | 11/2009 | Bishop .......................... | 434/226 |
| 7,789,666 | B2 * | 9/2010 | Sovine et al. ................. | 434/226 |
| 7,972,139 | B2 * | 7/2011 | Staub ............................. | 434/226 |
| 8,128,408 | B2 * | 3/2012 | Phillips et al. ................ | 434/226 |
| 8,167,621 | B2 * | 5/2012 | Allen ............................. | 434/226 |
| 8,197,257 | B2 * | 6/2012 | Clewis .......................... | 434/226 |
| 2005/0050816 | A1 * | 3/2005 | Manning et al. ................ | 52/213 |

* cited by examiner

*Primary Examiner* — Kurt Fernstrom
(74) *Attorney, Agent, or Firm* — Frank V. DeRosa

(57) ABSTRACT

Apparatus for training the art of forcible door entry for emergency personnel such as firefighters and, in particular, a reusable forcible entry door training apparatus that allows individuals to simulate forcible entry of outward opening metal doors mounted in metal frames.

20 Claims, 5 Drawing Sheets

FORCIBLE ENTRY TRAINING DOOR SYSTEM

CROSS-REFERENCE TO RELATED APPLICATION

This application is a Continuation of U.S. patent application Ser. No. 13/267,822, filed on Oct. 6, 2011, now U.S. Pat. No. 8,419,435, which claims priority to U.S. Provisional Patent Application Ser. No. 61/391,070, filed on Oct. 7, 2010, the disclosures of which are fully incorporated herein by reference.

TECHNICAL FIELD

The present invention relates generally to apparatus for training the art of forcible door entry for emergency personnel such as firefighters and, in particular, a reusable forcible entry door training apparatus that allows individuals to simulate forcible entry of outward opening metal doors mounted in metal frames.

BACKGROUND

In emergency situations, police, firefighters, and other first responders may need to forcibly enter a building or dwelling to gain access in order to save lives. One common method of forcible entry involves forcibly opening a locked door. To master the skill of forcible door entry, one should have a basic knowledge of the types and doors and security devices that may be encountered, as well as knowledge training in the types of tools that may be used for forcible door entry.

Emergency Services typically rely on a number of different devices to force entry to a building or vehicle. Prying tools, such as "Halligan" tools and crowbars are common tools used to breach doors and windows. A Halligan is a special tool commonly used by firefighters for prying, twisting, punching, or striking. FIG. 1 schematically illustrates a conventional "Halligan" tool that is commonly used by firefighters for forcible door entry. The tool 10 includes a claw (or fork) 11, a blade (wedge) 12 (what is commonly referred to as an ADZ end), and a tapered spike 13, which is especially useful in quickly forcing open many types of locked doors. Either the ADZ end or fork end of the tool can be used to break through the latch of a swinging door by forcing the tool between the door and door jamb and prying the two apart, striking it with a fiat-head axe, for example.

To know how to correctly and efficiently open a locked door in an emergency using a Halligan tool, a person should be trained in the use of the Halligan tool, and then perfect the knowledge by practice. For instance, knowledge of the type of door and its components is important to allow proper placement and use of a forcible entry tool such as a Halligan tool. By way of example, the direction of the door opening (inward or outward opening) and the type and material composition of the door frame (wood, metal) are important factors that dictate the manner in which forcible entry of a locked door should be conducted.

SUMMARY OF THE INVENTION

Exemplary embodiments of the invention generally include reusable forcible entry door training apparatus that allow individuals to simulate forcible entry of outward opening metal doors mounted in metal frames.

In one exemplary embodiment of the invention, a forcible entry door training apparatus includes a base plate and a rectangular frame mounted to the base plate. The rectangular frame includes a plurality of jamb elements fixedly connected to each other, wherein the plurality of jamb elements include a first vertical side jamb, a second vertical side jamb, a horizontal top jamb and a horizontal bottom jamb. The apparatus also includes a plurality of door stop edges formed disposed along backside edges of each of the plurality of jamb elements, and at least one pair of holding brackets extending between front and backside edges of at least two opposing jamb elements of the frame. The holding brackets serve to retain a portion of a metal door within the rectangular frame when a forcible entry tool is wedged between a side edge of the door and the one of the first and second vertical side jambs of the frame.

In other exemplary embodiments of the invention, the holding brackets may extend between the first and second vertical side jambs and/or extend between the top and bottom side jambs.

In yet another exemplary embodiment of the invention, the first and second vertical side jambs are fixedly spaced apart from each other to accommodate a standard door width such as 36 inches, 34 inches, 32 inches, 30 inches or 24 inches.

In another exemplary embodiment of the invention, the forcible entry door training apparatus further includes a third vertical side jamb which is adjustably mounted between the fixed first and second vertical side jambs. The third vertical side jamb may be removably connected to the top and bottom door stop edges of the top and bottom jambs of the frame, and/or the retaining brackets. The third vertical side jamb can be adjustably mounted in spaced relation to the first vertical side jamb to fit a standard width door of, e.g., 34 inches, 32 inches, 30 inches or 24 inches.

In yet another exemplary embodiment of the invention, the forcible entry training apparatus further includes a side plate element that is removably connected to one of the first and second vertical side jambs to simulate forcible entry of a recessed outward swinging metal door.

These and other embodiments, aspects, features and advantages of the present invention will become apparent from the following detailed description of preferred embodiments, which is to be read in conjunction with the accompanying figures.

DETAILED DESCRIPTION OF EXEMPLARY EMBODIMENTS

In general, apparatus and methods as described herein include training props and methods of using training props to provide realistic simulation of forcible entry techniques on metal doors. More specifically, exemplary embodiments include training props which simulate forcible entry of outward opening metal doors mounted in metal frames in which pieces of standard metal doors are used in conjunction with the training prop and destroyed during use of the training prop in order to produce a realistic training experience.

Figure 2:
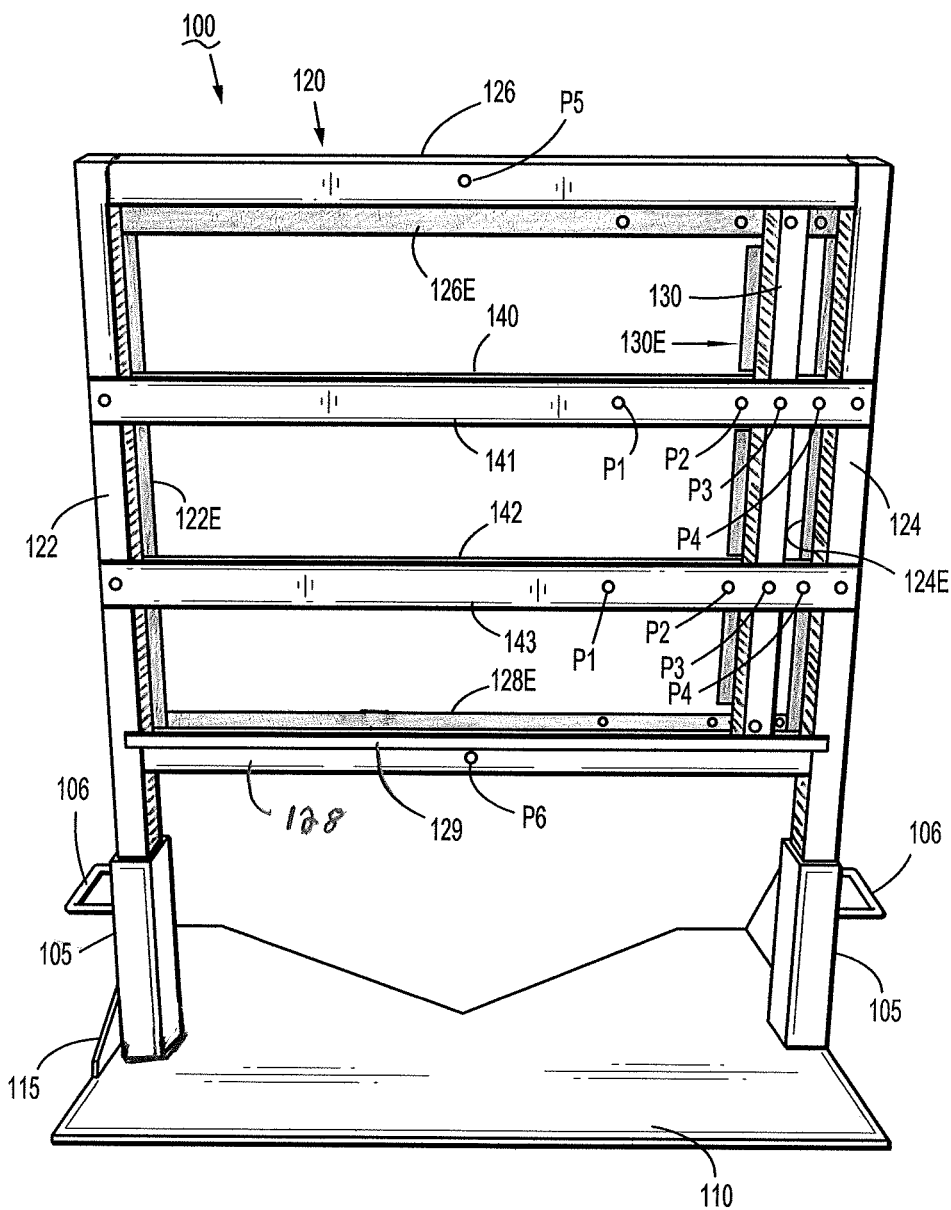
FIG. 2 is a schematic perspective view of a forcible entry door training apparatus according to an exemplary embodiment of the invention.

By way of example, FIG. 2 is a schematic perspective view of a forcible entry training apparatus according to an exemplary embodiment of the invention. The training apparatus 100 comprises a base plate 110, and a frame 120 mounted to the base plate 110 by mounting elements 105. The mounting elements have handles 106 to manually maneuver the training apparatus 100. The base plate 110 is preferably constructed from a heavy gauge steel or metal plate, and has sufficient weight and dimensions to prevent tipping of the frame 120 when forces are exerted during a forcible door entry training procedure.

The frame 120 comprises a first vertical side jamb 122, a second vertical side jamb 124, a horizontal top jamb 126, a horizontal bottom jamb 128 and an adjustable vertical side jamb 130. The jamb elements 122, 124, 126, 128 and 130 may be made from pieces of rectangular tubular steel with a width (e.g., 2 inch tubular steel) that is the same or similar to the thickness of conventional steel doors to be used with the prop. The top jamb 126 is secured (e.g., welded) between the top ends of the vertical jambs 122, 124 and the bottom jamb 128 is secured (e.g., welded) between the vertical jambs 122 and 124, thereby defining a fixed rectangular frame structure. The bottom ends of the vertical jambs 122 and 124 are insertably mounted into the mounting elements 105.

The jamb elements 122, 124, 126, 128 and 130 have respective door stop edges 122E, 124E, 126E, 128E and 130E disposed along the backside edges of the jambs. The door stop edges 122E, 124E, 126E, 128E and 130E may be formed with strips of ¼ inch steel that are welded along side edges of the rectangular tubular steel pieces forming the jambs. The bottom jamb 128 includes a front side retaining edge 129 disposed along a frontside edge of the jamb 128 opposite the stop edge 128E on the backside thereof.

The apparatus 100 further comprises a first pair of opposing holding brackets 140/141 and a second pair of opposing holding brackets 142/143, disposed between the upper and lower jambs 126 and 128. The frontside brackets 141 and 143 are removable brackets that are removably mounted (e.g., bolted) to the frontside of vertical jambs 122 and 124. The backside brackets 140 and 142 may be fixedly connected (e.g., welded) to the backside of the vertical jambs 122 and 124. The first pair of holding brackets 140/141 and second pair of holding brackets 142/143 serve to retain a portion of a metal door within the frame. The first pair of holding brackets 140/141 and second pair of holding brackets 142/143 and are preferably constructed from metal of sufficient gauge (such as strips of ¼ inch steel) to withstand repeated stresses from, forces exerted against them during a forcible door entry training simulation.

The first pair of holding brackets 140/141 and second pair of holding brackets 142/143 also serve to secure the adjustable vertical jamb 130 at different locations between the side jambs 122 and 124, which allows different width metal doors to be used with the prop. For example, each pair of holding brackets 140/141 and 142/143 comprise a series of holes at positions P1, P2, P3 and P4 along the length thereof through which bolts are passed to facilitate placement of the adjustable vertical jamb 130 at different locations between the side jambs 122 and 124 for use with standard width metal doors. In one exemplary embodiment, pieces of metal doors with standard widths of 24, 30, 32 and 34 inches can be used with the prop by securing the adjustable vertical jamb 130 at positions P1, P2, P3 and P4, respectively.

For instance, as depicted in FIG. 2, the adjustable jamb 130 may be secured in place between each pair of holding brackets 140/141 and 142/143 at position P3 by passing bolts through the holes formed at points P3 of holding brackets 140/141 and 142/143 and corresponding holes formed in the adjustable jamb 130. In this example, the spacing between inner sides of the jambs 122 and 130 would be sufficient for use with metal doors of standard widths of 32 inches, for example.

In one exemplary embodiment, a metal door with a standard width of 36 inches can be directly inserted between the two side jambs 122 and 124 with the adjustable vertical jamb 130 removed. In this regard, the rectangular frame 120 can be made with dimensions such that a fixed distance between the inner sides of vertical jambs 122 and 124 can accommodate standard door widths of 36 inches, or any other standard door widths. In addition, holes may be formed in the stop edges 126E and 128E (as shown in FIG. 2) which are aligned to the holes at points P1, P2, F3 and P4 of the brackets. These holes in stop edges 126E and 128E are made to align to corresponding holes formed in the top and bottom ends of the vertical jamb 130 so that the ends of the vertical jamb 130 can be bolted to the top and bottom jambs 128 and 128 to secure the adjustable vertical jamb in place at the various positions.

Overall, the exemplary training device 100 can be used to simulate forcible entry of an outward left hand or outward right hand opening door. In particular, a portion of a standard width metal door can be inserted within the frame 120 and secured between the side jamb 122 and adjustable jamb 130 (for, e.g., 24, 30, 32 or 34 inch doors), or between the vertical side jambs 122 and 124 directly for a 36 inch width door. This is done by removing the frontside removable brackets 141 and 143, and inserting a cut length piece of metal door between the respective jambs and then securing the door piece in place in the frame 120 by bolting the front removable brackets 141 and 143 to the respective jambs 122, 130 and 124.

Figure 4:
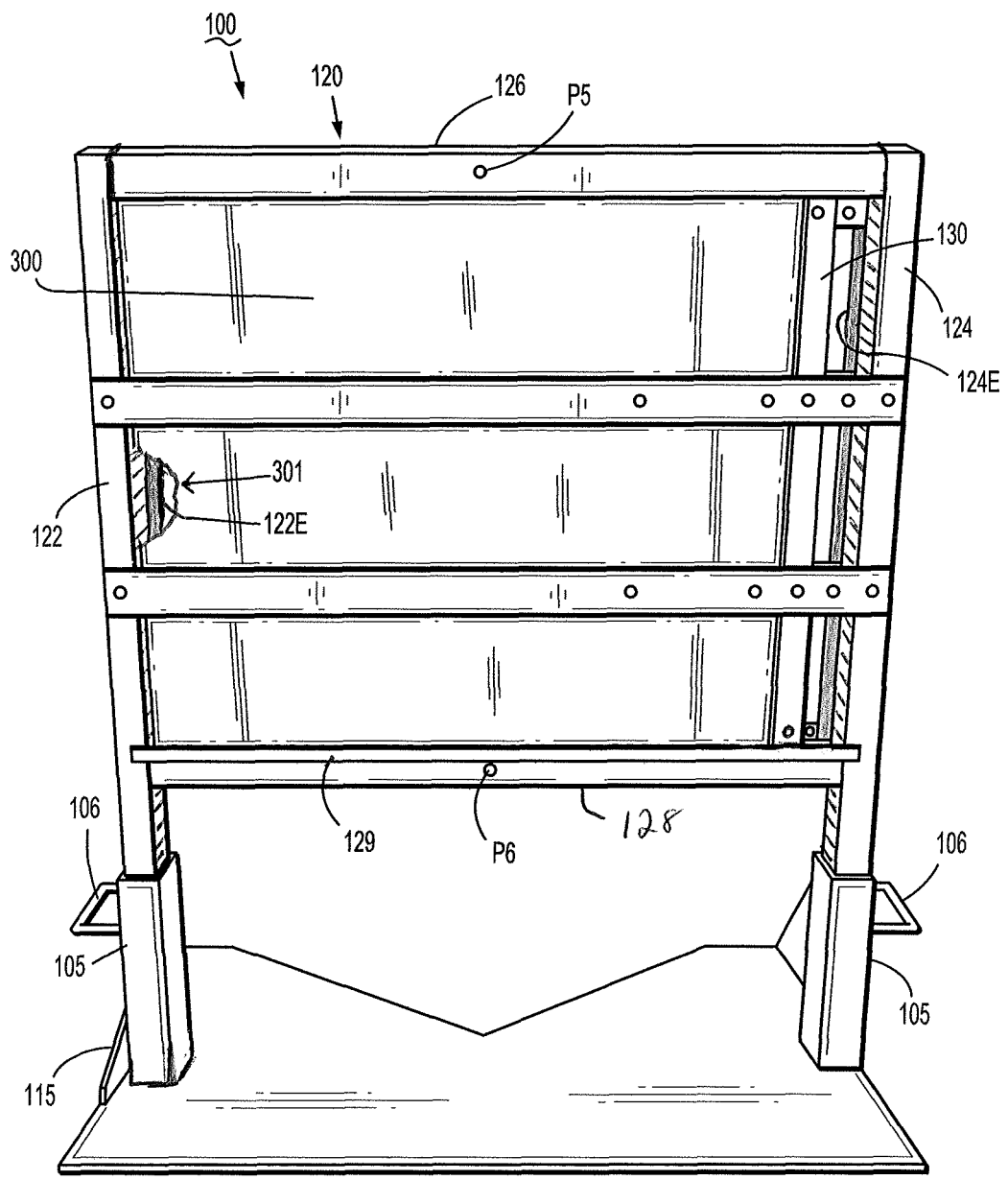
FIG. 4 schematically depicts a method for using a forcible entry door training apparatus according to an exemplary embodiment of the invention.

FIG. 4 illustrates the exemplary training apparatus 100 of FIG. 2 with a piece of a metal door 300 insertably mounted within the frame between the side jamb 122 and the adjustable vertical jamb 130. With the door in place, simulation of forcible entry of a left outward swinging metal door can be accomplished by forcing the ADZ end of a Halligan tool, for example, between the door edge and the left jamb 122 and then leverage the Halligan tool to crush the edge of the door to create a sufficient "purchase" or gapping between the left jamb 122 and crushed door edge.

By way of example, FIG. 4 illustrates a crushed edge portion 301 of the metal door 300 that is achieved using this technique. In particular, the crushed edge 301 of the door 300 creates a sufficient purchase exposing the jamb stop edge 122E. In this instance, the jamb edge 122E simulates a metallic "door stop" which must be exposed by crushing the edge of the metal door to create a sufficient "purchase" or gapping that would enable one to insert the ADZ end, for example, of the Halligan tool past the jamb edge 122E around to the backside of the door, as would be required to force open a metallic outward swinging door.

Similarly, with the door in place, simulation of forcible entry of a right outward swinging metal door can be accomplished by forcing the ADZ end of a halligan tool, for example, between the door and the right jamb 124 or 130 and then leverage the Halligan tool to crush the edge of the door to create a sufficient "purchase" or gapping that would enable one to insert the ADZ end, for example, of the Halligan tool past the jamb edge 124E or the jamb edge 130E (depending on the width of door used) around to the backside of the door. In this instance, the jamb stop edges 124E or 130E would simulate a metallic "door stop" which must be exposed by crushing the metal door to properly gap the door as would be required to force open a right metallic outward swinging door.

During use, it is intended that the jamb members of the frame 120 and the holding brackets be reused for each forcible door entry training simulation, while portions of metal doors used in the prop are replaced after a number of simulations. Pieces of conventional metal doors are used as consumable products to be replaced as required due to damage suffered during a forcible door entry training simulation. The actual crushing of the metal doors during simulation provide realistic simulation of crushing forces that would be required to forcibly open outward swinging metallic doors.

Figure 3A:
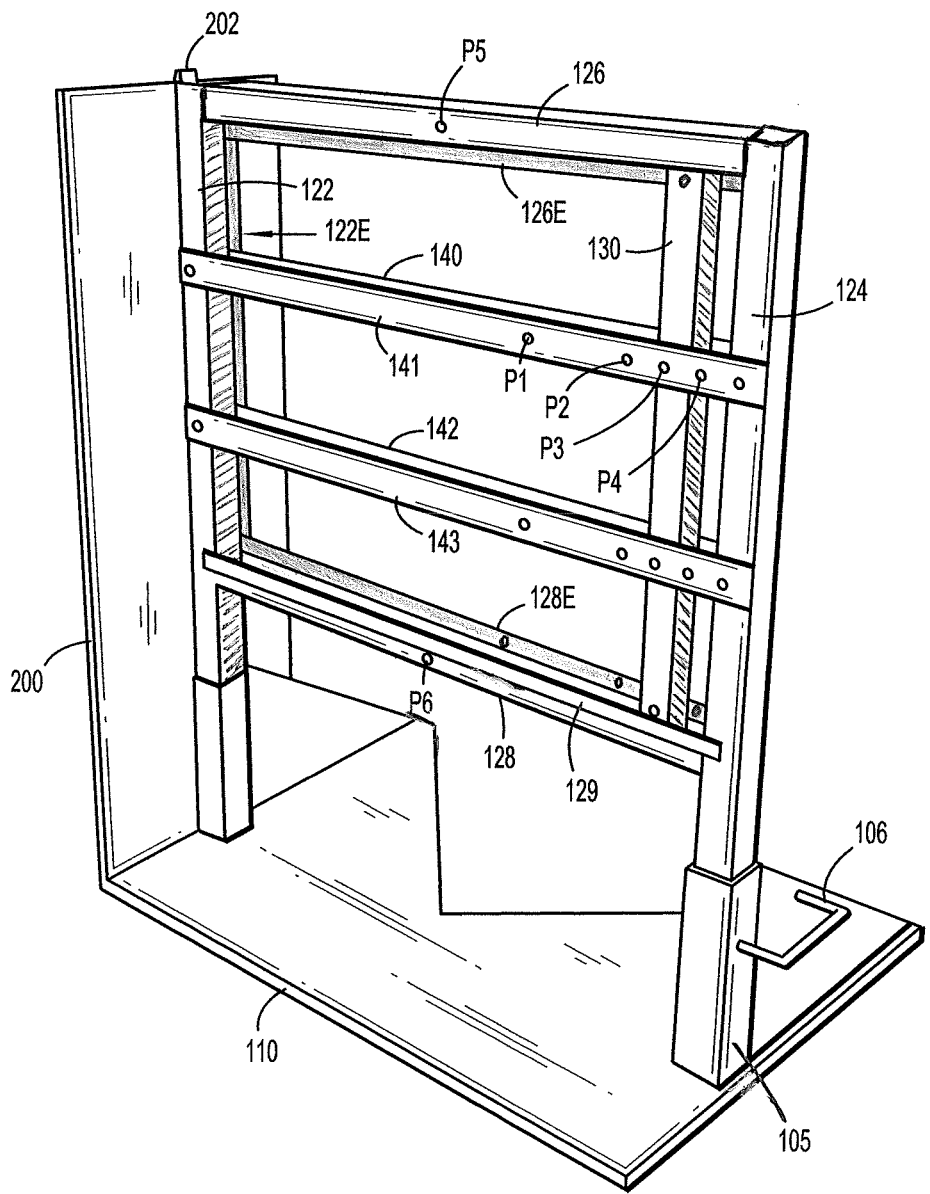
FIGS. 3a and 3b are schematic perspective views of a forcible entry door training apparatus according to another exemplary embodiment of the invention.
Figure 3B:
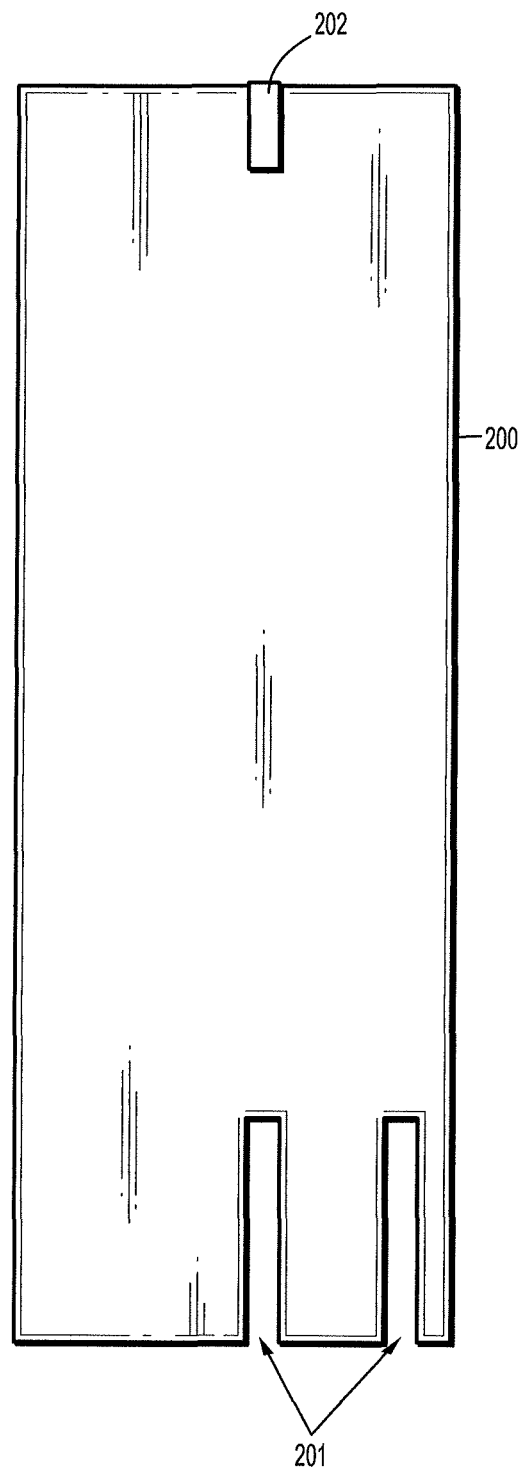

FIGS. 3*a* and 3*b* are schematic views of a forcible entry door training apparatus according to another exemplary embodiment of the invention. In FIGS. 3*a* and 3*b*, the training prop is modified to include a side plate element 200 that can be removably connected to the side jamb 122 to simulate forcible entry of a recessed outward swinging metal door that has a sidewall (simulated by the plate element 200) providing limited space for forcible entry. The plate 200 is attached to the side jamb 122 by inserting the bottom edge of the plate 200 between a lip 115 (see FIG. 2) on the base plate 110 and the mounting member 105. The plate 200 has a clip element 202 formed on the top thereof which is inserted into the open top portion of the jamb 122 to hold the top of the plate 200 on the jamb 122 while the bottom of the plate 200 is held in place between the lip portion 115 of the base plate 110. Slots 201 may be formed in the bottom portion of the side plate 200 to provide room for handles 106 that may be formed on the bottom of the mounting element 105. The plate 200 may be formed from a heavy gauge steel or metal plate having a thickness of, e.g., ¼ inch. The spacing (or gap) between an outside surface of the mounting member 105 and the lip 115 will be made slightly larger than the thickness of the side plate 200 so that the bottom edge of the side plate 200 can be slideably inserted between the mounting member 105 and the lip 115, while being securely held in position.

In addition, although the accompanying Figures depict exemplary training props with horizontal brackets 140/141 and 142/143, vertically disposed holding brackets may be employed to secure a piece of metal door within the prop frame 120. For instance, as depicted in FIGS. 2 and 3A, vertically aligned bolt holes P5 and P6 may be formed through top and bottom jamb members 126 and 128 through which bolts may be passed to secure a vertical frontside bracket (not shown) made of a strip of ¼ inch steel, for example, to the front of the jambs 126 and 128. For example, when used in this manner, both horizontal front side brackets 141 and 143 would be removed, and one of the frontside brackets 141 or 143 could be connected to the front of the jambs 126 and 128 to provide a vertical frontside bracket. In this instance, a piece of steel door can foe held in place in the frame 120 by the horizontal backside brackets 140 and 142 and the frontside vertical bracket (that extends between bolt, holes P5 and P6). With the frontside horizontal brackets 141 and 143 removed, the vertical adjustable jamb 130 can be secured in place by bolting the top and bottom ends of the vertical jamb 130 to vertically aligned holes formed in jamb stop edges 126E and 128E of the top and bottom jambs 126 and 128.

Figure 1:
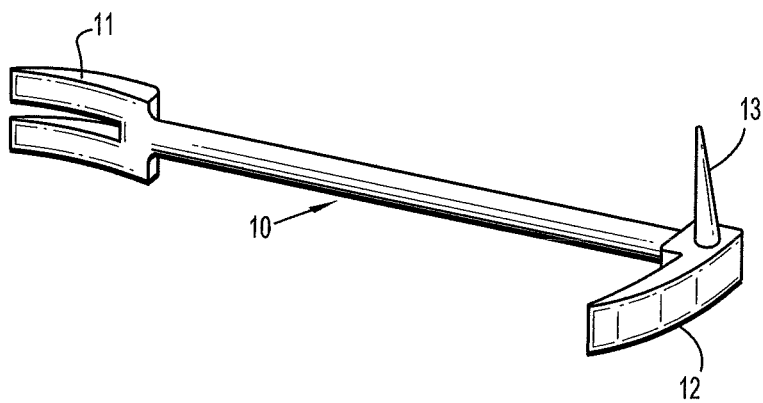
FIG. 1 illustrates a conventional Halligan forcible entry tool.

A frontside vertical holding bracket may be employed when the training apparatus 100 is used to simulate prying open an outwardly swinging metallic door using the ADZ end 12 of the Halligan tool 10 (see FIG. 1). More specifically, after forming a crushed portion 301 of the metal door 300 (as shown in FIG. 4) using techniques as discussed above, a trainee would insert the ADZ end 12 of the Halligan tool 10 past the jamb edge 122E around the backside of the door 300 and leverage the Halligan tool against the front side of the jamb 122 to outwardly pry open the door 300 to simulate forcibly opening a metallic outward swinging door. In this instance, as the door 300 is pried outwardly away from the side jamb 122, the door 300 would start to bend at the point along an edge of the vertical frontside bracket that is vertically connected between the upper and lower jambs 126 and 128 between bolt holes P5 and P6. This bending force applied to the door along the edge of the vertical frontside bracket would simulate a force that would be encountered to break a deadbolt or other locking mechanism when forcibly opening an outward swinging metal door.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

I claim:

1. A forcible entry door training apparatus for use with at least a portion of a door, comprising:
 a base plate;
 a rectangular frame, mounted to the base plate, the rectangular frame comprising a plurality of jamb elements fixedly connected to each other, wherein the plurality of jamb elements include a first vertical side jamb, a second vertical side jamb, a horizontal top jamb and a horizontal bottom jamb; and
 at least one pair of holding brackets extending between front and backside edges of at least two opposing jamb elements of the frame,
 wherein the at least one pair of holding brackets serve to retain said at least the portion of the door within the rectangular frame when a forcible entry tool is wedged between a side edge of the door and the one of the first and second vertical side jambs of the frame.

2. The forcible entry door training apparatus of claim 1, wherein the jamb elements are formed from rectangular tubular steel.

3. The forcible entry door training apparatus of claim 1, wherein the at least one pair of holding brackets extend between the first and second vertical side jambs.

4. The forcible entry door training apparatus of claim 3, wherein at least a first holding bracket is fixedly connected to a backside edge of the first and second vertical side jambs and wherein at least a second holding bracket is removably mounted to a frontside edge of the first and second vertical side jambs opposite the first holding bracket.

5. The forcible entry door training apparatus of claim 1, wherein the at least one pair of holding brackets extend between the top and bottom side jambs.

6. The forcible entry door training apparatus of claim 1, wherein the first and second vertical side jambs are fixedly spaced apart from each other to accommodate a door width of 36 inches, 34 inches, 32 inches, 30 inches, or 24 inches.

7. The forcible entry door training apparatus of claim 1, further comprising a third vertical side jamb which is adjustably mounted between the fixed first and second vertical side jambs.

8. The forcible entry door training apparatus of claim 7, wherein the third vertical side jamb is removably connected to at least one of the top and bottom jambs of the frame.

9. The forcible entry door training apparatus of claim 7, wherein the third vertical side jamb is removably connected to the at least one pair of holding brackets.

10. The forcible entry door training apparatus of claim 7, wherein a spacing between the first vertical side jamb and third vertical side jamb is adjustable to accommodate a plurality of different door widths.

11. The forcible entry door training apparatus of claim 10, wherein the plurality of different door widths include widths of 34 inches, 32 inches, 30 inches and 24 inches.

12. The forcible entry training, apparatus of claim 1, further comprising a side plate element that is removably connected to one of the first and second vertical side jambs to simulate forcible entry of a recessed outward swinging door.

13. The forcible entry training apparatus of claim 1, wherein the apparatus enables simulation of forcible entry of a left or right outward swinging door.

14. The forcible entry training apparatus of claim 1, further comprising a plurality of door stop edges disposed along backside edges of each of the plurality of jamb elements.

15. The forcible entry training apparatus of claim 1, further comprising a portion of a door mounted within the rectangular frame and held in place by the at least one pair of holding brackets.

16. The forcible entry training apparatus of claim 15, wherein the portion of the door is a portion of a metal door.

17. A method for forcible entry door training, comprising the steps of:

placing at least a portion of a door within a rectangular frame that is mounted to a base plate, the rectangular frame comprising a plurality of jamb elements fixedly connected to each other, wherein the plurality of jamb elements include a first vertical side jamb, a second vertical side jamb, a horizontal top jamb and a horizontal bottom jamb;

retaining said at least the portion of the door within the rectangular frame using, at least one pair of holding brackets extending between front and backside edges of at least two opposing jamb elements of the frame; and wedging a forcible entry tool between a side edge of the door and the one of the first and second vertical side jambs of the frame to simulate forcible entry of a left or right outward swinging door.

18. The method of claim 17, further comprising adjusting a third vertical side jamb so that said at least the portion of the door is disposed between the third vertical side jamb and one of the fixed first and second vertical side jambs.

19. The method of claim 18, further comprising removably connecting the third vertical side jamb to at least one of the top and bottom jambs of the frame.

20. The method of claim 18, further comprising removably connecting the third vertical side jamb to the at least one pair of holding brackets.

* * * * *